United States Patent
Blahut et al.

(10) Patent No.: US 6,807,188 B1
(45) Date of Patent: Oct. 19, 2004

(54) RANGING ARRANGEMENT AND METHOD FOR TDMA COMMUNICATIONS

(75) Inventors: Donal E. Blahut, Holmdel, NJ (US); Peter D. Magill, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/356,980

(22) Filed: Jul. 19, 1999

(51) Int. Cl.[7] ............................................. H04B 7/212
(52) U.S. Cl. ...................................... 370/442; 370/478
(58) Field of Search ................................. 370/252, 318, 370/442, 436, 449, 453, 457, 458, 503, 508, 519, 498, 478; 379/128, 323, 395.01, 32.01, 82, 79, 88.24

(56) References Cited

U.S. PATENT DOCUMENTS

| | | | |
|---|---|---|---|
| 6,307,868 B1 * | 10/2001 | Rakib et al. | 370/485 |
| 6,356,555 B1 * | 3/2002 | Rakib et al. | 370/441 |
| 6,507,592 B1 * | 1/2003 | Hurvig et al. | 370/503 |
| 6,665,308 B1 * | 12/2003 | Rakib et al. | 370/441 |

* cited by examiner

*Primary Examiner*—Dang Ton
*Assistant Examiner*—Phuc Tran

(57) ABSTRACT

An out-of-band ranging technique is automatically initiated at a customer premises equipment unit when the equipment is installed, when power is restored after a power failure or interruption, upon verification of the equipment, upon reconnection after a disconnection of the equipment or the like. To this end, an out-of-band tone is employed that is automatically transmitted when the customer premises equipment that transmits the TDMA signal is powered ON, or transmitted in response to a specific command generated locally or remotely. Specifically, when ranging is being effected the customer premises equipment generates and transmits the out-of-band ranging tone until a message is received from a remote terminal indicating that the transmission of the ranging tone be terminated. The loop delay being determined is the delay interval between transmission of the termination message and detection that transmission of the ranging tone has terminated. Then, a message is transmitted to the customer premises equipment that contains the ranging delay interval that is to be used in all future transmissions to the remote terminal. In one embodiment of the invention, the customer premises equipment automatically switches to an idle standby state when the remote terminal removes its upstream transmission slot. In the standby state, the customer premises equipment is still capable of receiving data and is periodically polled by the remote terminal assigning it an upstream transmission slot. If a customer premises equipment in the standby state is not polled during a predetermined interval, it automatically switches to a verification state. Additionally, if the customer premises equipment does not respond when polled, the remote terminal transmits it a message putting it in the verification state. If a polled customer premises equipment responds with an out-of-band tone, which indicates that it is in the verification state, the remote terminal treats it as though it is verifying ranging. If the out-of-band tone is properly aligned, the customer premises equipment is switched to an active state.

50 Claims, 8 Drawing Sheets

RANGING ARRANGEMENT AND METHOD FOR TDMA COMMUNICATIONS

RELATED APPLICATIONS

U.S. patent applications Ser. Nos. 09/356,978 and 09/356,979 were filed concurrently herewith.

TECHNICAL FIELD

This invention is related to Time Division Multiple Access (TDMA) communications and, more particularly, to ranging in the transmission of TDMA signals.

BACKGROUND OF THE INVENTION

In TDMA transmission of signals it is required that all the individual signal components of the TDMA transmission have equal transmission delay. Consequently, a delay interval must be determined for each signal included in the TDMA transmission which when added to the individual signal yields a common loop delay for that signal equal to individual loop delay of the other TDMA signal components. To determine the particular delay to be added to each of the TDMA signal components, a so-called "ranging" procedure is effected when an equipment unit which will transmit the signal is installed, relocated, or otherwise has a disruption in service. A popular prior known ranging procedure is so-called "in-band ranging", where in-band ranging messages are employed to effect the ranging procedure. Unfortunately, the use of the in-band ranging messages requires that the transmission bandwidth be temporarily interrupted and used for transmitting the in-band ranging messages. Thus, in-band ranging is an intrusive procedure that interferes with normal bandwidth use. Additionally, it is necessary to schedule when the in-band ranging is to be done. Indeed, as the rate at which in-band ranging is scheduled is increased, more and more transmission bandwidth is lost. This is extremely undesirable because the bandwidth cannot be used for other purposes, for example, constant bit rate transmission.

SUMMARY OF THE INVENTION

These and other problems and limitations of the prior known in-band ranging procedure are addressed by employing a non-intrusive out-of-band ranging technique. Ranging is automatically initiated at a customer premises equipment unit when the equipment is installed, when power is restored after a power failure or interruption, upon verification of the equipment, upon reconnection after a disconnection of the equipment or the like. To this end, an out-of-band tone is employed that is automatically transmitted when the customer premises equipment that transmits the TDMA signal is powered ON, or transmitted in response to a specific command generated locally or remotely.

Specifically, when ranging is being effected the customer premises equipment generates and transmits the out-of-band ranging tone until a message is received from a remote terminal indicating that the transmission of the ranging tone be terminated. The loop delay being determined is the delay interval between transmission of the termination message and detection that transmission of the ranging tone has terminated. Then, a message is transmitted to the customer premises equipment that contains the ranging delay interval that is to be used in all future transmissions to the remote terminal.

In one embodiment of the invention, the customer premises equipment automatically switches to an idle standby state when the remote terminal removes its upstream transmission slot. In the standby state, the customer premises equipment is still capable of receiving data and is periodically polled by the remote terminal assigning it an upstream transmission slot. If a customer premises equipment in the standby state is not polled during a predetermined interval, it automatically switches to a verification state.

Additionally, if the customer premises equipment does not respond when polled, the remote terminal transmits it a message putting it in the verification state. If a polled customer premises equipment responds with an out-of-band tone, which indicates that it is in the verification state, the remote terminal treats it as though it is verifying ranging. If the out-of-band tone is properly aligned, the customer premises equipment is switched to an active state.

An advantage of polling customer premises equipment in the idle standby state is that it enables system operations to distinguish between an idle customer premises equipment, power outages, disconnected or otherwise removed customer premises equipment.

DETAILED DESCRIPTION

Figure 1:
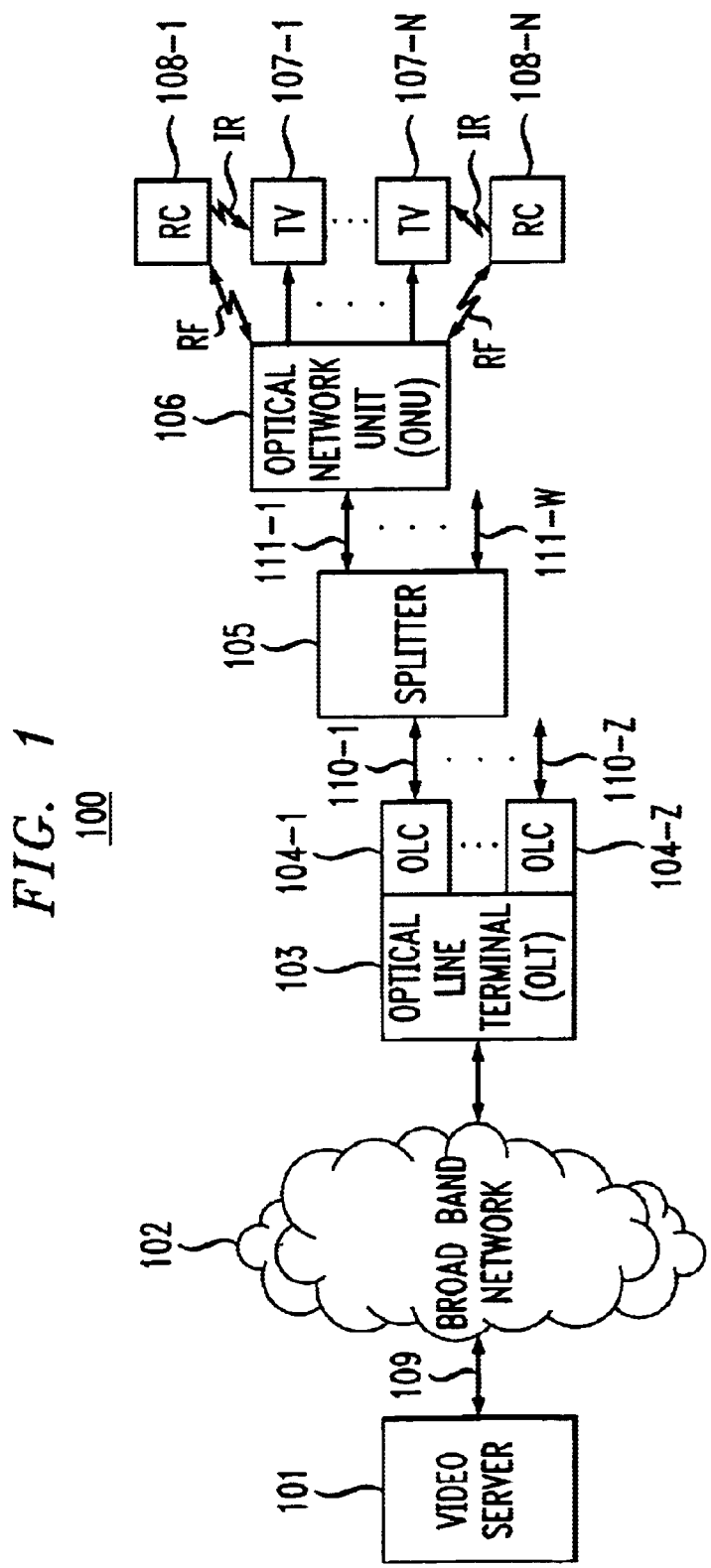
FIG. 1 shows, in simplified block diagram form, a video distribution system employing an embodiment of the invention.

FIG. 1 shows, in simplified block diagram form, a video distribution system employing an embodiment of the invention. Specifically, shown is network 100 including video server 101 which supplies downstream video signals to broadband network 102, in response to an upstream communication including a selection message. Broadband network 102 supplies the communications signals to and from optical line terminal 103. At optical line terminal (OLT) 103, optical line circuit (OLC) 104 interfaces to an optical fiber line. The optical fiber line is, for example, a power splitting passive optical network (PSPON) fiber including optical fibers 110 and 111 on which optical signals are transmitted using coarse wavelength division multiplexing. Transmission on the fiber lines 110 and 111 is achieved using two wavelengths, 1550 nano meters (nm) downstream, for example, to a home and 1310 nm upstream, for example, from the home. The PSPON fibers 110 may be split into a predetermined number of optical fibers, for example, 32 fibers 111, thereby interfacing via associated ONUs 106 with 32 locations. Note that OLT 103 serves one or more OLCs 104, namely, 104-1 through 104-Z, coupled to a corresponding number of fiber lines, namely, 110-1 through 110-Z, respectively, and that an OLC 104 serves one or more ONUs 106 via optical fibers 111-1 through 111-W. In this example, the downstream transmission of video signals is in asynchronous transfer mode (ATM) cells via time division multiplex (TDM), while upstream transmission of communication is via time division multiple access (TDMA), and both downstream and upstream communications is at 155.52 Mb/sec. Efficient TDMA communications in the upstream direction requires all optical network units (ONUs) 106 to have equal loop delay in relationship to their associated OLC 104. This is realized by employing a ranging procedure that is executed when each ONU 106 associated with a particular OLC 104 is installed, moved, returned to service, or the like. The ranging procedure defines an artificial delay that when added to the transmission loop delay of an ONU 106 yields the required common loop delay. The desired ranging delay is obtained, in this example, by employing a unique out-of-band ranging procedure, in accordance with the invention Actually, OLT 103 is a special ATM switch including a traditional ATM fabric and input/output (I/O) ports. In this example, two types of I/O boards are required, namely, standard SONET (synchronous optical network) boards, e.g., OC-12 units, and OLC boards. Video signals received from OLT 103 as ATM cells from one or more SONET boards are distributed to the OLC boards. Because of this, upstream channel select messages being sent to a video services controller in video server 101 are intercepted within the OLT 103, which accumulates the number of viewers of each video program that is OLT 103 wide. Only channel (program) selections that are not available within presently received SONET VCs are passed on to the video services controller 202 in video server 101. Additionally, messages are sent by OLT 103 to video server 101 and, therein, to a video services controller therein (not shown) whenever a transmitted video program is no longer being viewed by any OLT 103 supported TV 107. It is noted that each of OLC units 104 includes, in this example, a CPU and memory that may be a microprocessor with memory, as described below.

Optical network unit (ONU) 106 terminates the PSPON 111 fiber and provides appropriate interfaces, in this example, to one or more television sets (TVs) 107-1 through 107-N. Each of TVs 107-1 through 107-N has an associated one of remote control (RC) units 108-1 through 108-N, respectively.

Network 100 supplies, for example, via one or more video services controller units in video server 101 in response to specific program requests, conventional broadcast TV programs, programs similar to those supplied via cable TV providers, satellite TV providers, video on demand and the like. Procedures for requesting and transmitting video programs are described in greater detail below.

As shown in FIG. 1, a residential video subsystem includes an ONU 106 and one or more TVs 107 and associated RC units 108. In this example, ONU 106 and TVs 107 are interconnected via coaxial (COAX) cable.

As indicated above, the desired ranging delay is effected by obtaining a measure of loop delay between an ONU 106 and its associated OLC 104. This is realized, in this example, my employing a unique out-of-band ranging arrangement, in accordance with the invention.

Figure 2:
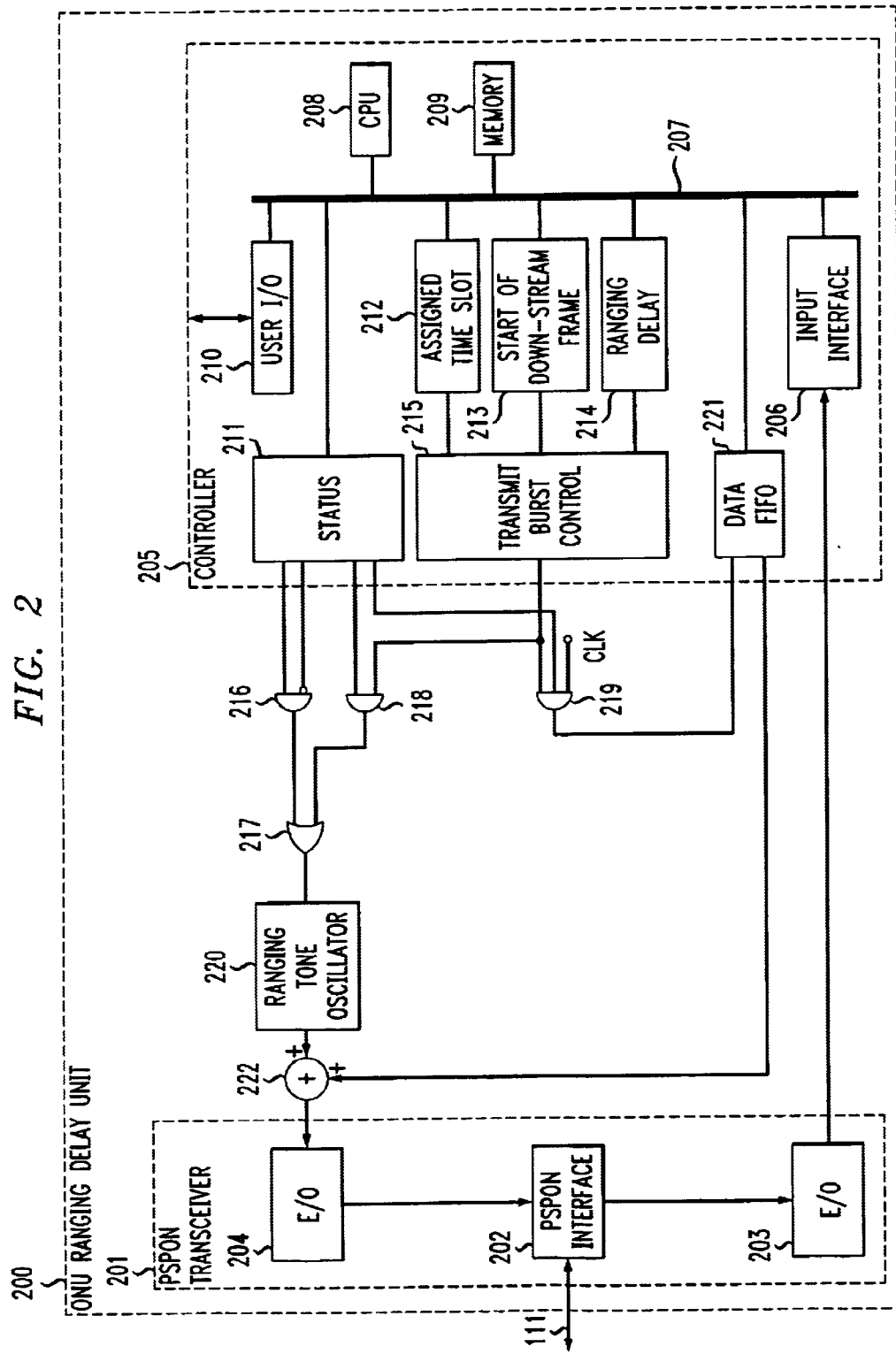
FIG. 2 shows, in simplified block diagram form, details of an ONU ranging delay unit employed in practicing the invention.

To this end, ONU 106 includes an ONU ranging delay unit 200 including, in this example, apparatus as shown in FIG. 2. Specifically, shown is PSPON transceiver 201 including PSPON interface 202 for interfacing PSPON optical fiber 111, in well known fashion. Incoming optical signals from PSPON fiber 111 are supplied to optical/electrical (O/E) converter 203 where they are converted into electrical signals. In turn, the incoming electrical signals are supplied to controller 205 and, therein, to input interface 206. Outgoing electrical signals are converted via electrical/optical (E/O) converter 204 to optical signals. In turn, the outgoing optical signals are supplied via PSPON interface 202 to PSPON optical fiber 111.

Controller 205 includes central processor unit (CPU) 208 which may be a microprocessor, memory 209, user input/output (I/O) units 210, status register 211, assigned time slot register 212, start of down-stream frame register 213, ranging delay register 214, transmit burst control unit 215 and data first-in-first-out (FIFO) register 221. Units 206, 208 through 215 and 221 are interconnected via bus 207. A power ON status signal is supplied to one input of AND gate 216, while an initialized status signal is supplied to an inhibit input of AND gate 216, both from status register 211. Thus, And gate 216 yields a high state output when power ON is a high state and initialized is a low state. This high state output from AND gate 216 is supplied via OR gate 217 to enable ranging tone oscillator 220 to supply as an output the desired out-of-band ranging tone. In this manner the ranging state is effected. Again, in this example, the out-of-band ranging tone is generated at 466.56 MHz. This ranging tone is supplied to summer 222 and, thereafter, to PSPON 111 via E/O 204 and PSPON interface 202.

A verify status signal is supplied from status register 211 to an input of AND gate 218, while a transmit burst control signal is supplied from transmit burst control 215 to a second input of AND gate 218. And gate 218 is controlled via the supplied signals to enable transmission of the out-of-band ranging tone during the assigned time slot to effect the verify state.

An active status signal is supplied from status register 212 to an input of AND gate 219, the transmit burst control signal is supplied to a second input of AND gate 219 and a clock (CLK) signal is supplied to a third input of AND gate 219. And gate is controlled via the supplied signals to control supplying the CLK signal to data FIFO 221, thereby enabling the active data state. The data output from data FIFO 221 is supplied via summer 222, E/O 204 and PSPON interface 202 to PSPON fiber III.

Operation of ONU ranging delay unit 200 is described below in conjunction with the flow chart of FIG. 4.

Figure 3:
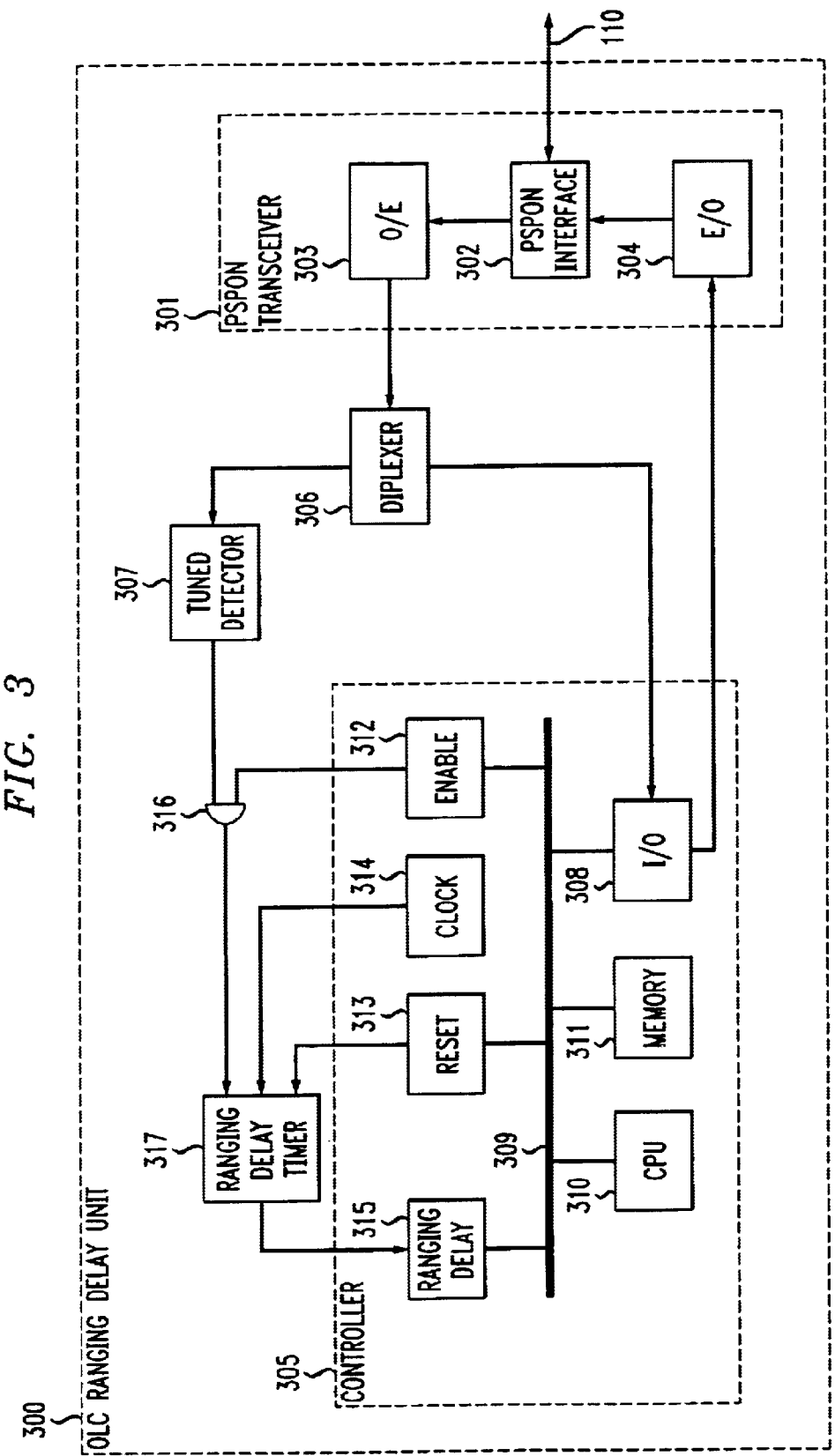
FIG. 3 shows, in simplified block diagram form, details of an OLC ranging delay unit employed in practicing the invention.

FIG. 3 shows, in simplified block diagram form, details of an OLC ranging delay unit employed in practicing the invention. Specifically, shown is PSPON transceiver 301 including PSPON interface 302 for interfacing PSPON optical fiber 110, in well known fashion. Incoming optical signals from PSPON fiber 110 are supplied to optical/electrical (O/E) converter 303 where they are converted into electrical signals. In turn, the incoming electrical signals are supplied to diplexer 306, which extracts and supplies the in-band data signals to controller 305 and, therein, to I/O 308. Diplexer 306 also extracts the out-of-band ranging tone and supplies it to tuned detector 307. A high state output from detector 307 indicating the reception of the out-of-band ranging tone is supplied to one input of AND gate 316.

Controller 305 includes I/O 308, CPU 310, which may be a microprocessor, memory 311, enable register 312, reset register 313, clock 314 and ranging delay register 315, all interconnected via bus 309.

An output from enable register 312 is supplied to a second input of AND gate 316 and when it is a high state signal and the high state tone detection signal is present, AND gate 316 supplies an enable high state signal to ranging delay timer 317. This enables timer 317 to count the clock output from clock 314. As described below, when the out-of-band ranging tone is no longer detected the count in timer 317 represents the loop delay for a particular ONU associated with this OLC. The loop delay interval is supplied to ranging delay register 315. A reset signal from reset register initializes ranging delay timer 317.

Operation of OLC ranging delay unit 300 is described below in conjunction with the flow chart of FIG. 5.

Figure 4A:
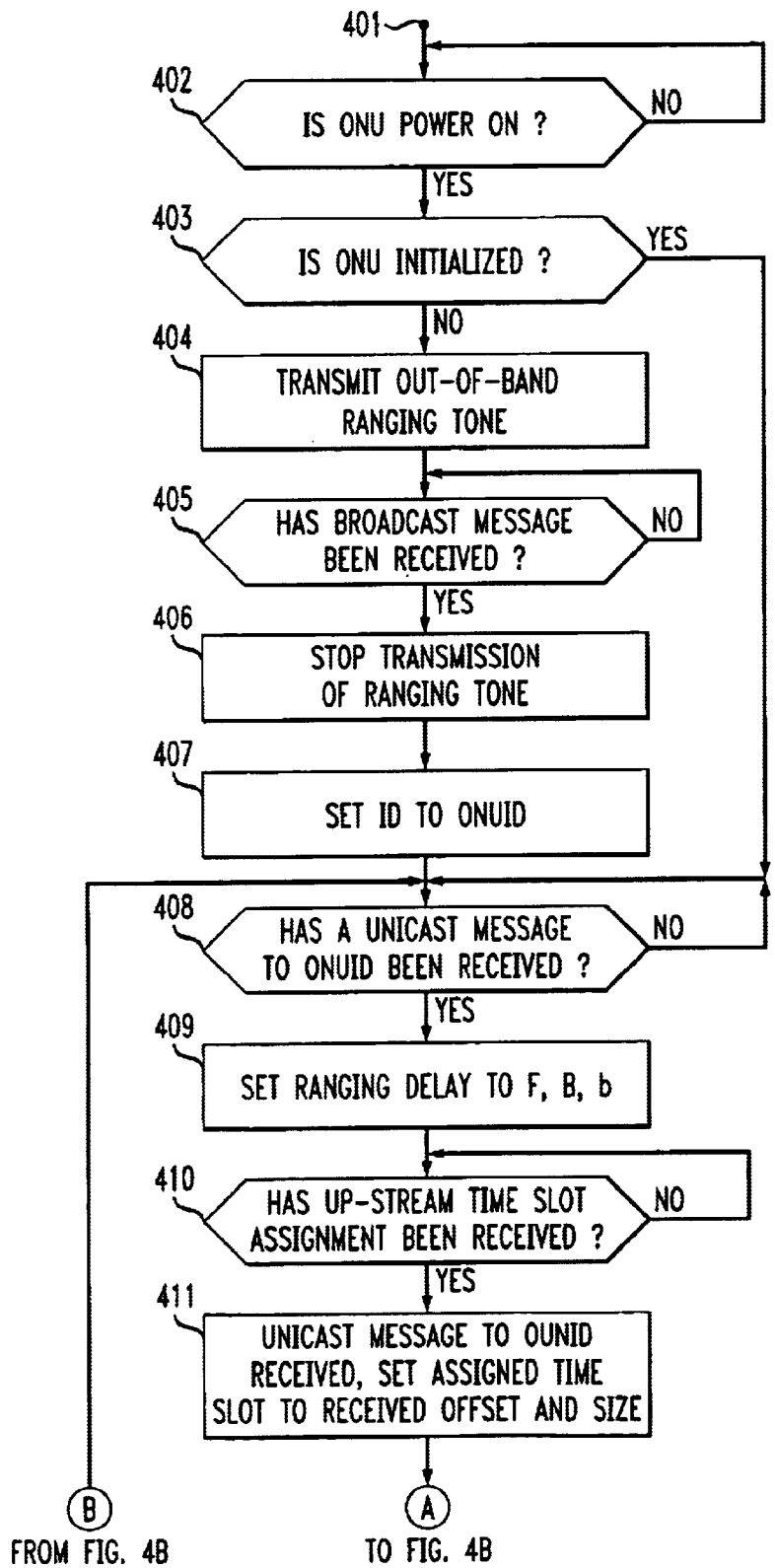
FIGS. 4A, 4B and 4C when connected A—A, B—B, C—C, D—D, E—E and F—F form a flow chart illustrating the steps in the ranging delay procedure of the ONU ranging delay unit of FIG. 2.
Figure 4B:
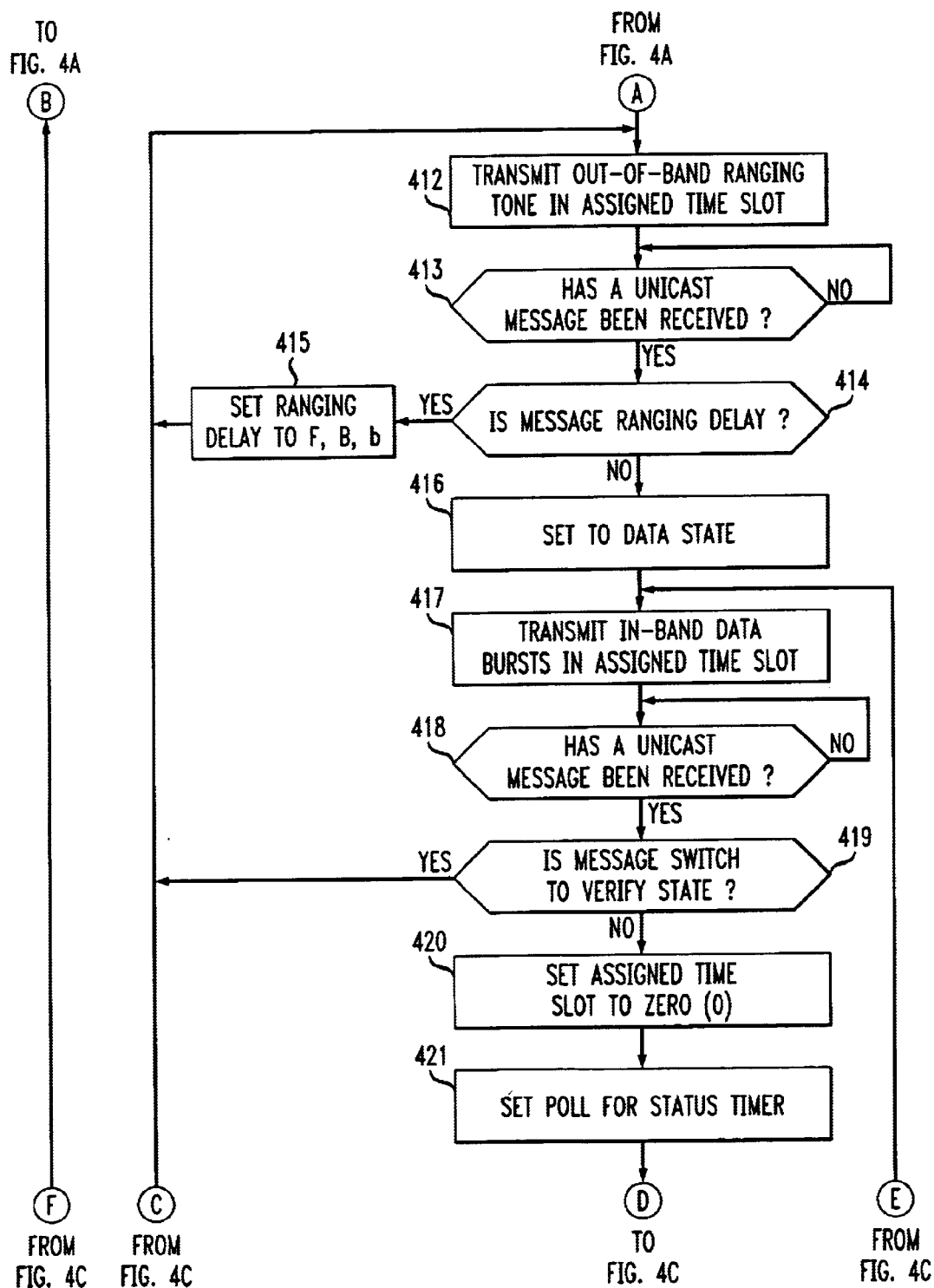
Figure 4C:
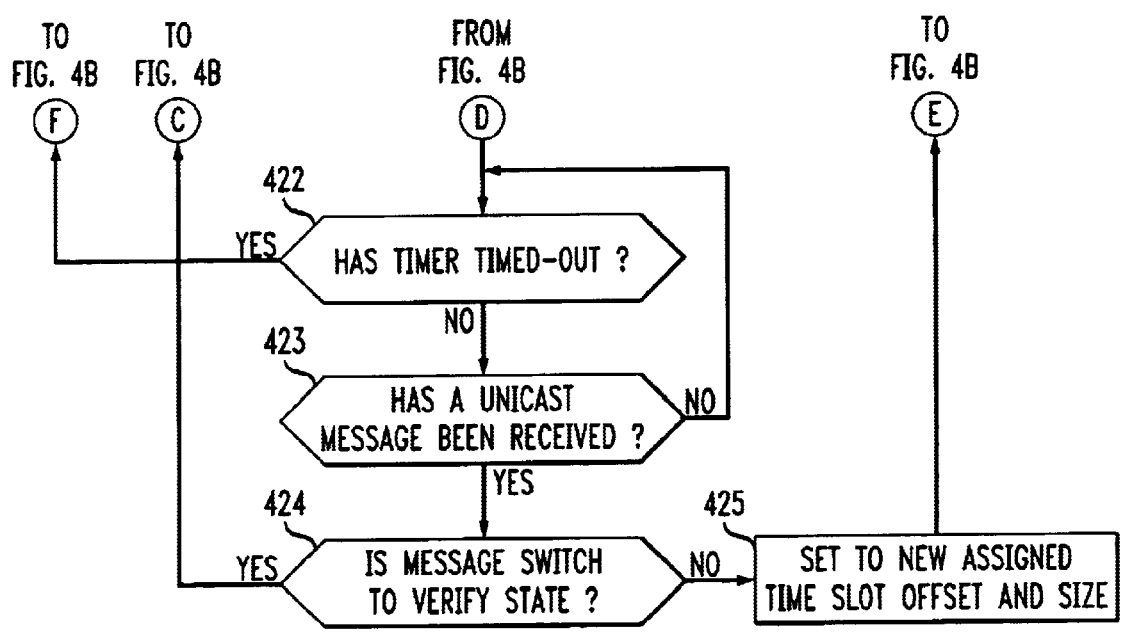

FIGS. 4A, 4B and 4C when connected A—A, B—B, C—C, D—D, E—E and F—F form a flow chart illustrating the steps in the ranging delay procedure of the ONU ranging delay unit of FIG. 2. The ONU 106 ranging delay procedure is begun at 401. Thereafter, step 402 tests to determine if ONU power is ON. If the test result is NO, step 402 is repeated until it yields a YES result. Then, step 403 tests to determine if the ONU is initialized. If the test result is YES, ONU 106 is in the initialized state and control is transferred to step 408. If the test result in step 403 is NO, ONU 106 has not been initialized and is in the ranging state, and step 404 causes the out-of-band ranging tone to be transmitted. Again, in this example, the ranging tone is generated at 466.56 MHz, which is outside the normal in-band message transmission band. Step 405 tests to determine if a broadcast message as been received by ONU 106. If the test result is NO, step 405 is repeated until a YES result is obtained. Note that the received broadcast message includes an instruction for the ONU to stop transmission of the ranging tone and that the ONU assume an ID. Then, step 406 causes the transmission of the ranging tone to be terminated. Step 407 sets the ID for ONU 106 to ONUID. Step 408 tests to determine if a unicast message has been received including the ranging delay determined for the ONUID, namely, "F" which is the number of frames, "B" which is the number of bytes and "b" which is the number of bits. In this example, F is a 0, 1 or 2 frame, B is between 0 and 2429 bytes, inclusive, and b is between 0 and 7 bits, inclusive. Step 409 causes the ranging delay for the ONUID to be set to the received values of F, B and b. Step 410 tests to determine if the up-stream time slot assignment for the ONUID has been received. If the test result is NO, step 410 is repeated until it yields a YES result indicating that the assigned time slot identified by its offset and size has been received. The offset is the number of bytes from the start of each frame and the size is the time slot length in bytes. Step 411 indicates that the unicast message to this ONUID including the assigned time slot has been received and causes the assigned time slot to be set to the received offset and size. Then, this ONU is in the verify state and step 412 causes the transmission of the out-of-band tone in the assigned time slot. Then, step 413 tests to determine if a unicast message to this ONUID has been received. If the test result is NO, step 413 is repeated until it yields a YES result. Step 414 tests to determine if the received message includes the ranging delay for this ONUID. If the test result is YES, step 415 causes the ranging delay for this ONUID to be set to the received F, B and b. Note that in the verify state, the ranging delay value may be fine tuned through the reception of new values for F, B and b. Thereafter, steps 412 through 415 are iterated until step 414 yields a NO result. Then, step 416 causes the ONU to be set to the data state. Step 417 causes the in-band data burst to be transmitted in the assigned time slot. This is the ONU active data state. Step 418 tests to determine if a unicast message for this ONUID has been received. If the test result is NO, step 418 is repeated until it yields a YES result, if at all. Then, step 419 tests to determine if the received unicast message is switch to verify state. If the test result is YES, the ONU reenters the verify state, control is transferred to step 412 and steps 412 through 419 are iterated until step 419 yields a NO result. Note that the verification state may be reentered because of some particular event being detected in ONU 106, for example, power failure, or from a control message from OLC 104. Thereafter, step 420 causes the assigned time slot to be set to zero (0). This is the ONU idle state. Step 421 causes the ONU to be set to poll for status timer. In this example, the time-out interval for the status timer is one (1) second. Then, step 422 tests to determine if the status timer has timed-out. If the test result in step 422 is YES, control is transferred to step 408 and appropriate ones of steps 408 through 422 are iterated until step 422 yields a NO result. Step 423 tests to determine if a unicast message for this ONUID has been received. If the test result is NO, steps 422 and 423 are repeated until either of them yields a YES result. If step 422 yields a YES result, operation is as described above. If step 423 yields a YES result, step 424 tests to determine if the received unicast message is switch to verify state. If the test result is YES, control is transferred to step 412 and appropriate ones of steps 412 through 424 are iterated until step 424 yields a NO result. Then, step 425 causes the assigned time slot to be set to a new assigned time slot, namely, a new offset and size. Thereafter, control is transferred to step 417, appropriate ones of steps 417 through 425 iterated and if necessary appropriate ones of steps 408 through 425 are iterated until the ONU again enters the active data state, i.e., its normal operational state.

Thus, it is seen that if the polled ONC responds with transmission of the out-of-band ranging tone, that is an indication that the ONU is already in the verify state and the associated OLC treats the ONU as though it was verifying ranging. If the out-of-band tone is properly aligned in the assigned time slot, the ONU is caused to switch to the active data state.

Additionally, requiring an idle ONU to be polled, enables system operations to distinguish among an idle ONU, a power outage and a relocated ONU, as described below in relationship to the operation of the OLC ranging unit.

Figure 5A:
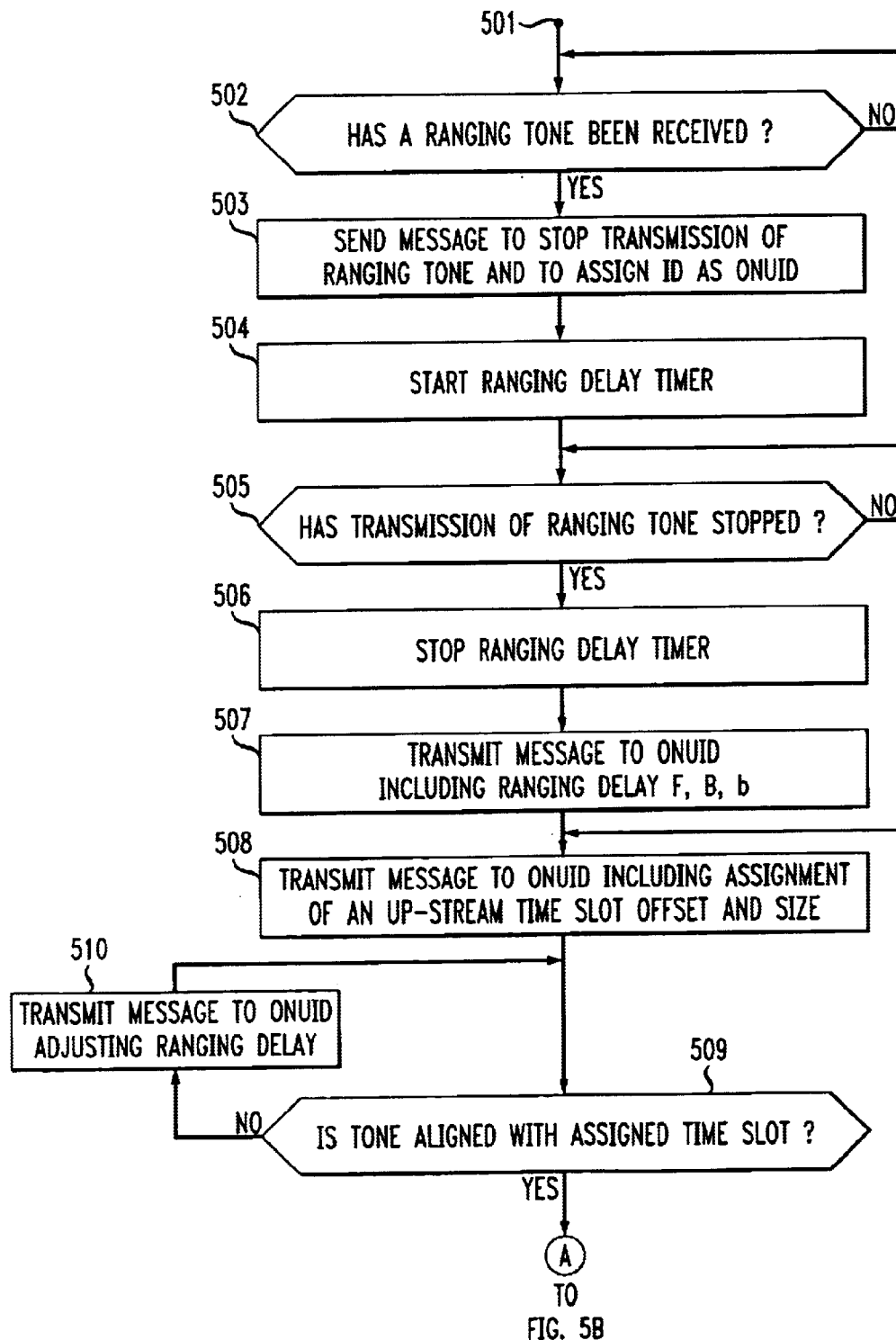
FIGS. 5A and 5B when connected A—A and B—B form a flow chart illustrating the steps in the ranging delay procedure of the OLC ranging delay unit of FIG. 3.
Figure 5B:
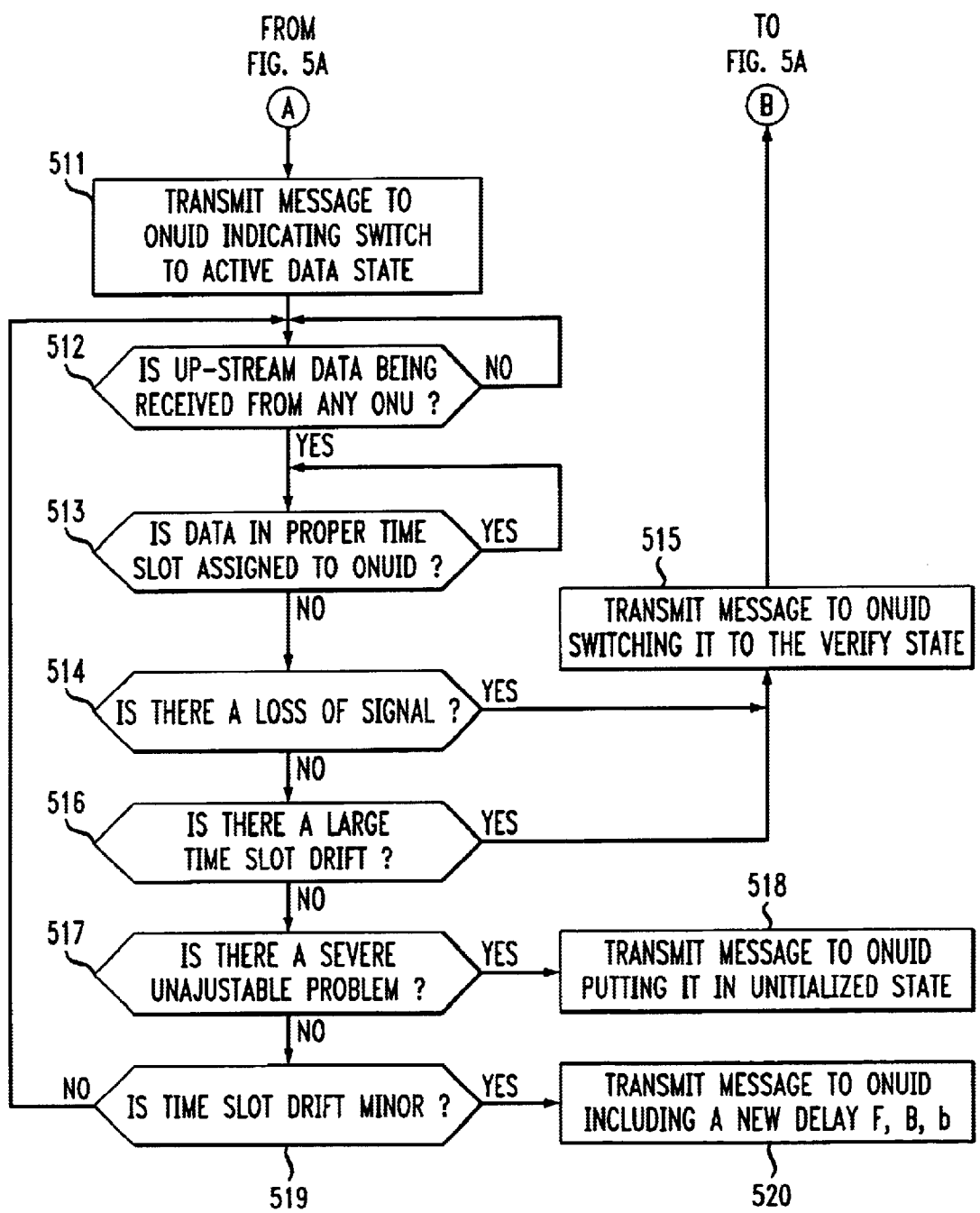

FIGS. 5A and 4B when connected A—A and B—B form a flow chart illustrating the steps in the ranging delay procedure of the OLC ranging delay unit of FIG. 3. The OLC ranging delay procedure is started in step 501. Thereafter, step tests to determine if a ranging tone has been received by the OLC from ONUID. If the test result is NO, step 502 is repeated until it yields a YES result. Then, step 503 causes a message to be transmitted to the ONUID causing it to stop transmitting the ranging tone and to assign the ONU ID as ONUID. Step 504 causes the ranging delay timer to be set. Then, step 505 tests to determine if the transmission of ranging tone has stopped. If the test result is NO, step 505 is repeated until it yields a YES result. Step 506 causes the ranging delay timer to be stopped. The accumulated time interval of the ranging delay timer is the ranging delay for the ONUID. That is, the interval between the terminate transmission of ranging tone message is sent by the OLC and detection that it has terminated is the loop delay for the ONUID. Then, step 507 causes the transmission of a unicast message to the ONUID including the determined ranging delay, namely, F, B and b. Step 508 causes the transmission of a message to the ONUID including assignment of an up-stream time slot, namely, offset and size. Step 509 tests to determine if an out-of band ranging delay tone presently being received in the assigned time slot is aligned with the assigned time slot. If the test result is NO, step 510 causes a message to be transmitted to the ONUID to adjust the ranging delay of the ONUID. Thereafter, step 509 again tests to determine if the out-of-band tone is aligned with the assigned time slot as adjusted. If the test result is NO, steps 510 and 509 are iterated until step 509 yields a YES result. Then, step 511 causes a message to be transmitted to the ONUID indicating that the ONU switch to the active data state. Step 512 tests to determine if up-stream data is being received from any ONU associated with this OLC. If the test result is NO, step 512 is repeated until it yields a YES result. Then, step 513 tests to determine if the data is in the proper time slot assigned to ONUID transmitting the data. If the test result is YES step 513 is repeated until it yields a NO result. Step 514 tests to determine if there is a loss of signal. If the test result is YES, step 515 causes a message to be transmitted to the ONUID switching it to the verify state. Then, control is transferred to step 508 and appropriate ones of steps 508 through 515 are iterated until step 514 yields a NO result. Step 516 tests to determine if there is a large time slot drift. If the test result is YES, control is transferred to step 515 and appropriate ones of steps 508 through 516 are iterated until step 516 yields a NO result. Then, step 517 tests to determine if there is a severe unadjustable problem. If the test result is YES, step 518 causes a message to be transmitted to the ONUID causing it to enter the uninitialized state. Returning to step 517, if the test result is NO, step 519 tests to determine if the time slot drift is minor. If the test result is NO, control is returned to step 512 and appropriate ones of steps 512 through 519 are iterated, and if necessary appropriate ones of steps 508 through 519 are iterated, until step 519 yields a YES result. Then, step 520 causes a message to be transmitted to the ONUID including a new ranging delay, namely, a new F, B and b.

Note that if a power outage renders one or more ONU associated with the OLC to be inoperative, a so-called "self-aware" system must re-establish a correct state of operation of the one or more associated ONUs automatically when power is restored. An ONU that loses power stops transmitting data and reverts to the verify state. The associated OLC detects the "loss of signal" from the one or more ONU that lost power, and deletes them from a list of up-stream time slot assignments. Then, the list of ONCs that are not in the active state are polled, as described above. Consequently, when power is restored, the ONUs are brought on-line one at a time.

If an ONU is moved or otherwise disconnected, it is placed into the un-iniatilized state by clearing its ranging delay. When the ONU is reconnected, it will automatically initiate the ranging procedure, as described above.

In certain instances an ONU can be disconnected or moved without prior knowledge of the system operators. For example, an ONU can be disconnected and, then, reconnected at some other location without notification to the system operators. When the ONU is disconnected it loses power and switches to the verify state, as described above. When an attempt is made to reconnect and reactivate the ONU, however, its out-of-band ranging tone will be positioned incorrectly in the up-stream frame. That is, the out-of-band tone will be in the wrong time slot. Because of this, the associated OLC generates a message and send it to the ONU, which resets the ONC to the un-initialized state. This, in turn, results in the automatic activation of the ranging procedure. That is, the ONU is treated as a newly connected ONU.

As shown, out-of-band ranging has no impact on up-stream bandwidth management, i.e., it is non-intrusive. Additionally, the probability of a "ranging" collision is minimized because an ONU ranges immediately upon it being connected to the network and powered on. Moreover, an out-of-band ranging tone offers additional capabilities for non-intrusive verification, handling power outages, switching an ONU to a low power standby state and ONU location moves, as described above.

The above-described embodiments are, of course, merely illustrative of the principles of the invention. Indeed, numerous other methods or apparatus may be devised by those skilled in the art without departing from the spirit and scope of the invention.

What is claimed is:

1. Apparatus for use in at least one local equipment unit at a prescribed local location to obtain a signal propagation ranging delay interval between the at least one local equipment unit and a remote equipment unit at a prescribed remote location, the apparatus comprising:

an indicator for supplying an indication of whether or not power is ON in the local equipment unit;

an indicator responsive to a power ON indication for indicating whether or not the at least one local equipment unit has being initialized by establishing a ranging delay interval;

a controllable transmitter, responsive to an indication that the at least one local equipment unit has not been initialized, for transmitting an out-of-band ranging delay tone at a frequency band out side a frequency band in which data signals are transmitted from said at least one local equipment unit to said remote equipment unit; and a receiver for receiving a stop transmitting out-of-band ranging tone message from said remote equipment unit to control the controllable transmitter to terminate transmission of said out-of-band ranging delay tone, and for receiving a message containing a representation of a delay interval to be applied to in-band data signals being transmitted from said at least one local equipment to said remote equipment.

2. The invention as defined in claim 1 further including a controllable delay unit responsive to said delay interval representation for controllably setting a delay for said in-band data signals being transmitted from said at least one local equipment to said remote equipment.

3. The invention as defined in claim 2 wherein said data is transmitted in a prescribed digital format including data bits organized into bytes in a repetitive frame.

4. The invention as defined in claim 3 wherein said representation of said delay interval includes a prescribed number of frames, a prescribed number of bytes and a prescribed number of bits.

5. The invention as defined in claim 4 wherein said prescribed number of frames is either 0, 1 or 2, said prescribed number of bytes is from 0 through 2429, and said prescribed number of bits is from 0 through 8.

6. The invention as defined in claim 3 wherein said data is transmitted in a time division multiple access (TDMA) digital format.

7. The invention as defined in claim 3 wherein said receiver receives a message including a time slot and said controllable transmitter transmits an out-of band tone signal in said time slot, whereby alignment of said out-of-band ranging tone signal with said time slot is verified.

8. The invention as defined in claim 3 wherein said receiver receives a message including an adjusted delay interval and said delay unit is supplied with said adjusted delay interval so that the adjusted delay interval is applied to said in-band data signals to be transmitted.

9. The invention as defined in claim 7 wherein said controllable transmitter in response to reception of a verification message, enables transmission of data signals including said delay interval.

10. The invention as defined in claim 9 wherein said time slot is assigned to a particular at least one local equipment unit.

11. The invention as defined in claim 10 wherein said time slot is assigned to be at a prescribed offset in each transmission frame and has a prescribed a prescribed size.

12. The invention as defined in claim 11 wherein said prescribed offset includes a prescribed number of bytes from the start of each of said data transmission frames and wherein said size is a prescribed number of said bytes.

13. The invention as defined in claim 9 wherein said receiver receives a verification message indicating that a verification state should be entered, and further including a switch responsive to said verification message for supplying an enable signal for said transmitter enabling it to transmit said out-of-band tone in said time slot so that said time slot is verified as the proper time slot or a new time slot is assigned for transmission of in-band data signals.

14. The invention as defined in claim 9 wherein said receiver receives a time slot message indicating that said time slot is zero (0), and further including a status timer which is set in response to reception of said time slot is zero message and a switch responsive to said status timer timing-out for supplying an enable signal for said transmitter enabling it to transmit said out-of-band tone in said time slot so that said time slot is verified as the proper time slot or a new time slot is assigned for transmission of in-band data signals.

15. Apparatus for use in at least one local equipment unit at a prescribed local location to obtain a signal propagation ranging delay interval between the at least one local equipment unit and a remote equipment unit at a prescribed remote location, the apparatus comprising:
means for supplying an indication of whether or not power is ON in the at least one local equipment unit;
means responsive to a power ON indication for indicating whether or not the at least one local equipment unit has being initialized by establishing a ranging delay interval;
means, responsive to an indication that the at least one local equipment unit has not been initialized, for transmitting an out-of-band ranging delay tone at a frequency band out side a frequency band in which data signals are transmitted from said at least one local equipment unit to said remote equipment unit; and
means for receiving a stop transmitting out-of-band ranging tone message from said remote equipment unit to control the controllable transmitter to terminate transmission of said out-of-band ranging delay tone, and for receiving a message containing a representation of a delay interval to be applied to in-band data signals being transmitted from said at least one local equipment to said remote equipment.

16. The invention as defined in claim 15 further including means, responsive to said delay interval representation, for controllably setting a delay for said in-band data signals being transmitted from said at least one local equipment to said remote equipment.

17. The invention as defined in claim 16 wherein said data is transmitted in a prescribed digital format including data bits organized into bytes in a repetitive frame.

18. The invention as defined in claim 17 wherein said representation of said delay interval includes a prescribed number of frames, a prescribed number of bytes and a prescribed number of bits.

19. The invention as defined in claim 17 wherein said means for receiving receives a message including a time slot and said means for transmitting transmits an out-of band tone signal in said time slot, whereby alignment of said out-of-band ranging tone signal with said time slot is verified.

20. The invention as defined in claim 17 wherein said means for receiving receives a message including an adjusted delay interval and said means for controllably adjusting delay is supplied with said adjusted delay interval so that the adjusted delay interval is applied to said in-band data signals to be transmitted.

21. The invention as defined in claim 19 wherein said means for transmitting includes controllable transmitter means, and in response to reception of a verification message, controls said controllable transmitter means to be enabled to transmit data signals including said delay interval.

22. The invention as defined in claim 21 wherein said time slot is assigned to a particular at least one local equipment unit.

23. The invention as defined in claim 22 wherein said time slot is assigned to be at a prescribed offset in each transmission frame and has a prescribed a prescribed size.

24. Apparatus for use in a system including at least one local equipment unit and a remote equipment unit to obtain signal propagation ranging delay interval between the at least one local equipment unit and a remote equipment unit, the apparatus comprising:
for use at said at least one local equipment unit
an indicator for supplying an indication of whether or not power is ON in the at least one local equipment unit,
an indicator responsive to a power ON indication for indicating whether or not the at least one local equipment unit has being initialized by establishing a ranging delay interval,
a controllable transmitter, responsive to an indication that the at least one local equipment unit has not been initialized, for transmitting an out-of-band ranging delay tone at a frequency band out side a frequency band in which data signals are transmitted from said at least one local equipment unit to said remote equipment unit, and
a local receiver for receiving a terminate transmitting out-of-band ranging tone message from said remote equipment unit to control the controllable transmitter to terminate transmission of said out-of-band ranging delay tone, and for receiving a message containing a representation of a delay interval to be applied to in-band data signals being transmitted from said at least one local equipment to said remote equipment; and
for use at said remote equipment unit
a detector for detecting reception of said out-of-band ranging delay tone,
a remote transmitter responsive to detection of receiving said ranging delay tone for transmitting said termination message to said at least one local equipment unit to terminate transmission of said ranging delay tone, and for transmitting a message including a representation of said ranging delay interval to said at least one local equipment unit, and
a delay timer which is started upon transmission of said termination message and stopped upon said detector detecting that reception of said ranging delay tone has terminated, wherein an interval between said starting and stopping of said timer is said ranging delay interval.

25. The invention as defined in claim 24 further including for use at said at least one local equipment unit a controllable delay unit responsive to said delay interval representation for controllably setting a delay for said in-band data signals being transmitted from said at least one local equipment to said remote equipment.

26. The invention as defined in claim 25 wherein said data is transmitted in a prescribed digital format including data bits organized into bytes in a repetitive frame.

27. The invention as defined in claim 26 wherein said representation of said delay interval includes a prescribed number of frames, a prescribed number of bytes and a prescribed number of bits.

28. The invention as defined in claim 26 wherein said data is transmitted in a time division multiple access (TDMA) digital format.

29. The invention as defined in claim 26 wherein said at least one local receiver receives a message including a time slot and said controllable transmitter transmits an out-of band tone signal in said time slot, whereby alignment of said out-of-band ranging tone signal with said time slot is verified.

30. The invention as defined in claim 26 wherein said receiver receives a message including an adjusted delay interval and said delay unit is supplied with said adjusted delay interval so that the adjusted delay interval is applied to said in-band data signals to be transmitted.

31. The invention as defined in claim 29 wherein said controllable transmitter in response to reception of a verification message, enables transmission of data signals including said delay interval.

32. The invention as defined in claim 31 wherein said time slot is assigned to a particular at least one local equipment unit.

33. The invention as defined in claim 26 wherein said remote transmitter transmits said message to said at least one local equipment unit assigning said time slot in which in-band data is to be transmitted from said at least one local equipment unit to said remote equipment unit.

34. The invention as defined in claim 33 further including for use at said remote equipment unit a detector for determining whether an out-of-band ranging delay tone being received is aligned with said assigned time slot and for generating an indication of whether or not said received out-of-band ranging delay tone is aligned in said assigned time slot.

35. The invention as defined in claim 34 wherein said remote transmitter, in response to an indication that said out-of-band ranging delay tone is aligned with said assigned time slot, transmits a message to said at least one local equipment unit indicating that it should switch to an active data signal transmission state.

36. The invention as defined in claim 34 further including for use at said remote equipment unit an adjustable ranging delay interval generator responsive to an indication that said out-of-band ranging delay tone is not aligned with said assigned time slot for adjusting said ranging delay interval so that said out-of-band ranging delay tone is aligned with said assigned time slot and wherein said remote transmitter transmits a message to said at least one at least one local equipment unit including an adjusted ranging delay interval.

37. The invention as defined in claim 35 further including for use at said remote equipment unit a detector for determining whether a data signal is being received from said at least one local equipment unit and whether it is aligned with said assigned time slot.

38. The invention as defined in claim 37 further including for use at said remote equipment unit a detector for determining whether there is a loss of said data signal, and wherein said remote transmitter, in response to an indication of said loss of data signal, transmits a message indicating that said at least one local equipment unit is to switch to a verification state to verify that said data signal is aligned with said assigned time slot.

39. The invention as defined in claim 37 further including for use at said remote equipment unit a detector for determining whether there is a substantial variation in alignment of said data signal with said assigned time slot, and wherein said remote transmitter, in response to an indication of said substantial variation of said data signal relative to said assigned time slot, transmits a message indicating that said at least one local equipment unit is to switch to a verification state to verify that said data signal is aligned with said assigned time slot.

40. The invention as defined in claim 37, further including for use at said remote equipment unit a detector for determining whether there is a minor variation of alignment of said data signal with said assigned time slot, and wherein said remote transmitter, in response to an indication of said minor variation of data signal relative to said assigned time slot, transmits a message including an adjusted ranging delay interval so that said data signal being transmitted from said at least one local equipment unit is aligned with said assigned time slot.

41. A method for use in at least one local equipment unit at a prescribed local location to obtain a signal propagation ranging delay interval between the at least one local equipment unit and a remote equipment unit at a prescribed remote location, the method comprising the steps of:

supplying an indication of whether or not power is ON in the at least one local equipment unit;

in response to a power ON indication, indicating whether or not the at least one local equipment unit has being initialized by establishing a ranging delay interval;

in responsive to an indication that the at least one local equipment unit has not been initialized, transmitting an out-of-band ranging delay tone at a frequency band out side a frequency band in which data signals are transmitted from said at least one local equipment unit to said remote equipment unit; and receiving a stop transmitting out-of-band ranging tone message from said remote equipment unit to control the controllable transmitter to terminate transmission of said out-of-band ranging delay tone, and for receiving a message containing a representation of a delay interval to be applied to in-band data signals being transmitted from said at least one local equipment to said remote equipment.

42. The method as defined in claim 41 further including the step of in responsive to said delay interval representation, controllably setting a delay for said in-band data signals being transmitted from said at least one local equipment to said remote equipment.

43. The method as defined in claim 42 wherein said data is transmitted in a prescribed digital format including data bits organized into bytes in a repetitive frame.

44. The method as defined in claim 43 wherein said representation of said delay interval includes a prescribed number of frames, a prescribed number of bytes and a prescribed number of bits.

45. The method as defined in claim 43 wherein said step of receiving receives a message including a time slot and said step of transmitting transmits an out-of band tone signal in said time slot, whereby alignment of said out-of-band ranging tone signal with said time slot is verified.

46. The method as defined in claim 43 wherein said step of receiving receives a message includes a step of adjusting said delay interval so that the adjusted delay interval is applied to said in-band data signals to be transmitted.

47. The method as defined in claim 45 wherein said step of transmitting includes a step of in response to reception of a verification message, controllably enabling transmission of data signals including said delay interval.

48. The method as defined in claim 47 wherein said time slot is assigned to a particular at least one local equipment unit.

49. The method as defined in claim 48 wherein said time slot is assigned to be at a prescribed offset in each transmission frame and has a prescribed a prescribed size.

50. A method for use in a system including at least one local equipment unit and a remote equipment unit to obtain signal propagation ranging delay interval between the at least one local equipment unit and a remote equipment unit, the method comprising the steps of:

for use at said at least one local equipment unit supplying an indication of whether or not power is ON in the at least one local equipment unit, in responsive to a power ON indication, indicating whether or not the at least one local equipment unit has being initialized by establishing a ranging delay interval, in responsive to an indication that the at least one local equipment unit has not been initialized, transmitting an out-of-band ranging delay tone at a frequency band outside a frequency band in which data signals are transmitted from said at least one local equipment unit to said remote equipment unit, and receiving a terminate transmitting out-of-band ranging tone message from said remote equipment unit to control the controllable transmitter to terminate transmission of said out-of-band ranging delay tone, and for receiving a message containing a representation of a delay interval to be applied to in-band data signals being transmitted from said at least one local equipment to said remote equipment; and for use at said remote equipment unit detecting reception of said out-of-band ranging delay tone, in response to detection of receiving said ranging delay tone from said at least one local equipment unit, transmitting said termination message to said at least one local equipment unit to terminate transmission of said ranging delay tone, transmitting a message including a representation of said ranging delay interval to said at least one local equipment unit, and controlling a delay timer to be started upon transmission of said termination message and stopped upon said detector detecting that reception of said ranging delay tone has terminated, wherein an interval between said starting and stopping of said timer is said ranging delay interval.

* * * * *